(12) United States Patent
Doncsecz

(10) Patent No.: US 6,187,378 B1
(45) Date of Patent: Feb. 13, 2001

(54) AUTOMATED SYSTEM AND METHOD FOR ELECTROLESS PLATING OF OPTICAL FIBERS

(75) Inventor: John T. Doncsecz, Allentown, PA (US)

(73) Assignee: Lucent Technologies Inc., Murray Hill, NJ (US)

(*) Notice: Under 35 U.S.C. 154(b), the term of this patent shall be extended for 0 days.

(21) Appl. No.: 09/164,297

(22) Filed: Oct. 1, 1998

(51) Int. Cl.[7] ........................................................ B05D 1/18
(52) U.S. Cl. ................. 427/163.2; 427/169; 427/304; 427/305; 427/312; 427/431; 427/433; 118/695; 118/696; 118/420; 118/423; 118/429; 118/503; 118/DIG. 18; 118/DIG. 19
(58) Field of Search ............................ 427/163.1, 431, 427/433, 169, 304, 305, 312, 163.2; 118/DIG. 18, 429, 695, 503, 696, 420, 423, DIG. 19

(56) References Cited

U.S. PATENT DOCUMENTS

| | | | |
|---|---|---|---|
| 2,497,119 | * 2/1950 | Fink | 118/429 |
| 3,554,497 | * 1/1971 | Zipperer | 366/279 |
| 3,956,540 | * 5/1976 | Laliberte | 118/429 |
| 4,643,918 | * 2/1987 | Orban | 427/305 |
| 4,853,258 | * 8/1989 | Gombert | 427/169 |
| 4,869,202 | * 9/1989 | Baker | 118/503 |
| 4,904,506 | * 2/1990 | Burnett et al. | 427/304 |
| 5,079,040 | * 1/1992 | Brandenburger | 427/305 |
| 5,330,801 | * 7/1994 | Monteiro et al. | 427/433 |
| 5,334,246 | * 8/1994 | Pietrzykowski | 118/698 |
| 5,372,293 | * 12/1994 | Corlay | 118/429 |
| 5,380,559 | * 1/1995 | Filas et al. | 427/305 |
| 5,913,976 | * 6/1999 | Patton et al. | 118/429 |

* cited by examiner

Primary Examiner—Laura Edwards
(74) Attorney, Agent, or Firm—Mathews, Collins, Shepherd & Gould P.A.

(57) ABSTRACT

An automated system for electroless metallization of optical glass fibers, includes a plurality of spaced apart plating stations having different solutions for electroless metallization of optical fibers. A motor-driven fiber transport and dipping apparatus is used in the system for shuttling optical glass fibers to the plating stations and immersing the optical glass fibers in the solutions. A programmable controller directs the transport and dipping apparatus to the plating stations in a selected order and at selected time intervals, and directs the apparatus at each of the stations to immerse the fibers into the solutions at a selected entry rate, for a selected duration, and at a selected withdrawal rate.

18 Claims, 6 Drawing Sheets

AUTOMATED SYSTEM AND METHOD FOR ELECTROLESS PLATING OF OPTICAL FIBERS

FIELD OF THE INVENTION

This invention relates to electroless metallization or plating of optical fibers, and in particular, to an automated system for electroless plating of optical fibers having increased plating accuracy and repeatability.

BACKGROUND OF THE INVENTION

Optical fibers are used extensively in modern telecommunications systems and sensing systems. In many of these systems, optical fibers guide light signals to and from optoelectronic devices located in hostile environmental media such as water, oil, high pressure, or vacuum. Such environments necessitate that the fibers be housed in hermetically sealed enclosures. The fibers must enter the enclosure through hermetically sealed feed-throughs. The hermetic seal typically is provided by metallizing the fibers and soldering them to the feed-throughs.

The fibers are typically metallized using conventional manual electroless plating. An operator physically immerses batches of fibers in the various processing solutions to plate the fibers. The properties and quality of the plating depends upon many factors, especially the rate of entry into the solutions, the duration in the solutions, and the rate of withdrawal from the solutions.

Unfortunately, it is very difficult for even highly skilled operators to immerse each batch of fibers in the processing solutions in a consistent and repeatable manner. The manual process results in variation of quality from one batch of fibers to the next and low production yields. Hence, an automated system for electroless metallization of optical fibers is needed that eliminates the inconsistencies associated with manual methods.

SUMMARY

An automated system for electroless metallization of optical glass fibers comprises a plurality of spaced apart plating stations having different solutions for electroless metallization of optical fibers. A motor-driven fiber transport and dipping apparatus is used in the system for shuttling optical glass fibers to the plating stations and immersing the optical glass fibers in the solutions. A programmable controller directs the transport and dipping apparatus to the plating stations in a selected order and at selected time intervals, and directs the apparatus at each of the stations to immerse the fibers into the solutions at a selected entry rate, for a selected duration, and at a selected withdrawal rate.

BRIEF DESCRIPTION OF THE DRAWINGS

The advantages, nature and various additional features of the invention will appear more fully upon consideration of the illustrative embodiments now to be described in detail in connection with the accompanying drawings wherein.

It is to be understood that these drawings are for purposes of illustrating the concepts of the invention and, except for graphical illustrations, are not to scale.

DETAILED DESCRIPTION OF THE INVENTION

Figure 1:
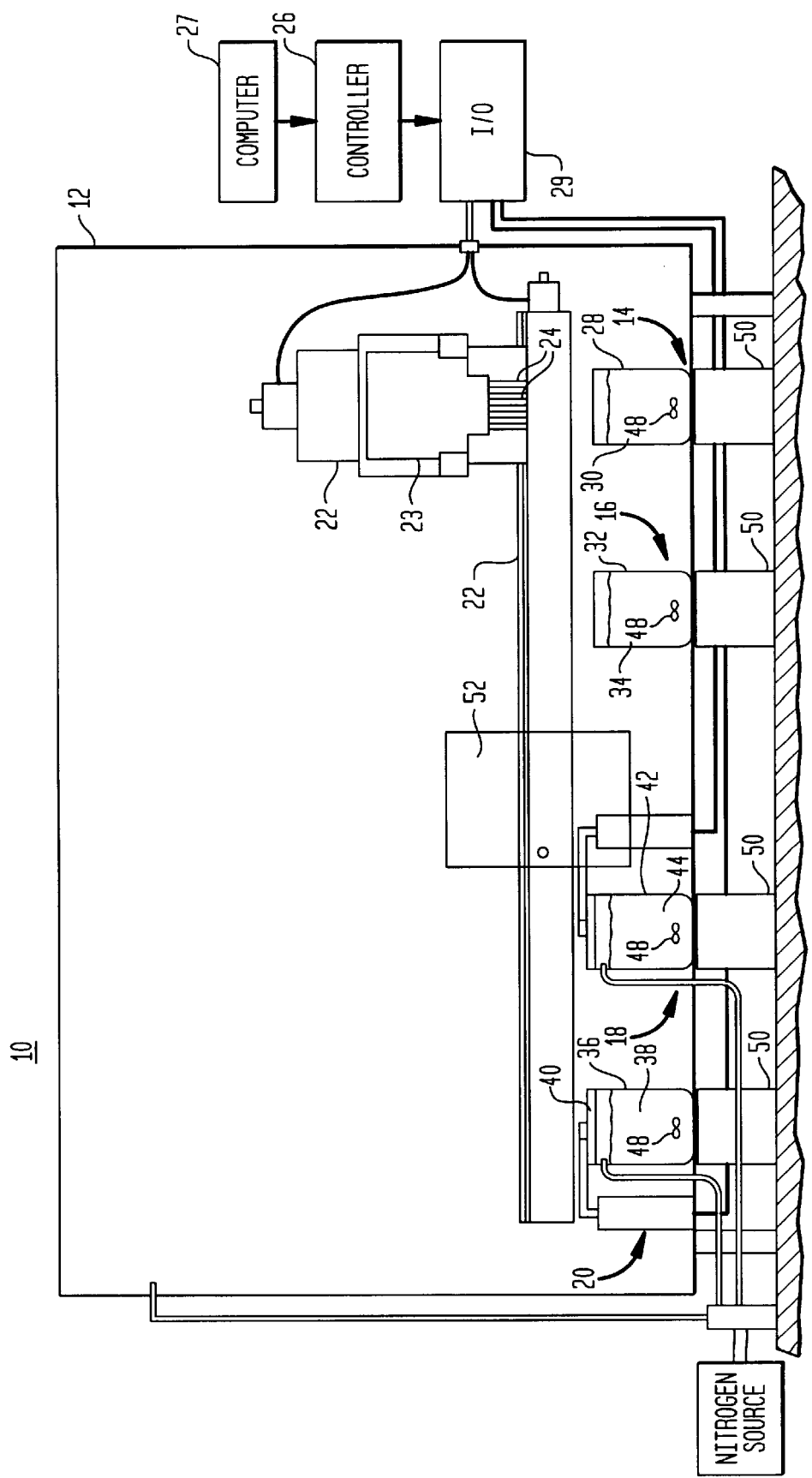
FIG. 1 is a schematic view of an automated plating system for electroless metallization or plating of optical fibers according to the present invention.

FIG. 1 shows an automatic plating system 10 for electroless metallization or plating of optical fibers. The system 10 comprises an enclosure 12 whose interior is divided into four plating stations 14, 16, 18, 20. The first plating station 14 includes a beaker 28 containing a preactivator/activator solution 30. As a preactivator, the solution 30 prepares the fiber and protective polymer coating interface of the fibers by removing residual acid from the fibers, and as activator, the solution 30 prepares the fiber and polymer coating of the fibers (the portion immediately adjacent the fiber) for adhesion with other plated metals such as nickel and gold. The preactivator/activator solution 30 also removes residual oxide from the treated surfaces of the fibers. The preactivator/activator solution 30 typically comprises a solution of palladium that forms very small clusters of palladium on the glass and/or metal. These palladium clusters function as catalysts to promote plating of the glass or metal surface.

The second plating station 16 includes a beaker 32 containing a water rinse solution 34 for removing excess preactivator/activation solution 30 from the fibers.

The third plating station 18 includes a beaker 42 containing a water rinse solution 44 for removing excess sensitizer solution 38 applied at the fourth plating station from the fibers. Nitrogen is also bubbled into this beaker 42 to prevent oxidation which can damage the metal layer. When not in use, a motor-driven removable cover 46 is used to prevent the escape of water vapor from the beaker 42 which could migrate to and harm the preactivator/activator solution 30 at the first plating station 14. The fourth plating station 20 includes a beaker 36 containing a sensitizer solution 38 which plates the glass surfaces of the fibers with about a monolayer of metal. The sensitizer solution 38 typically comprises a plating solution of tin. Oxidation of the sensitizer solution 38 is prevented by a nitrogen blanket created across the solution 38 by bubbing nitrogen into the beaker 36. A motor-driven remobable cover 40 is used to maintain the nitrogen blanket across the sensitizer solution 38 when not in use.

A motor-driven fiber transport and dipping apparatus 22 disposed inside the enclosure 12, shuttles optical glass fibers to the plating stations 14, 16, 18, 20 and immerses them in the solutions 30, 34, 38, 44. The fiber transport and dipping apparatus 22 includes a detachable fiber holding fixture 23 that substantially encloses the fibers, allowing only end sections of the fibers 24 to be exposed for plating. A programmable controller 26 directs the transport and dipping apparatus 22 to the plating stations 14, 16, 18, 20 in a programmed order and at programmed time intervals. The controller 26 further directs the apparatus 22 to immerse the exposed end sections of the fibers 24 into the solutions 30, 34, 38, 44 at a programmed entry rate, for a programmed duration, and at a programmed withdrawal rate.

Magnetic stirrers 48 are provided in each of the beakers 28, 32, 36, 42 for mixing the solutions 30, 34, 38, 44. The stirrers 48 are driven by magnetic driving devices 50 disposed immediately below each of the beakers 28, 32, 36, 42, outside of the enclosure 12.

Oxidation of the solutions and the metal layers is further prevented by maintaining a nitrogen atmosphere inside the enclosure 12 during plating. A door 52 is provided on a front sidewall of the enclosure 12 for gaining access to the components inside the enclosure 12.

Control signals of the controller 26 are routed to the transport and dipping apparatus 22, the motor-driven beaker covers 40, 46 and the magnetic stirrer driving devices 50 via input/output circuitry 29 that is connected to the controller 26. The programmable controller 26 operates in accordance with specially designed plating programs which are stored in a computer 27 that is also connected to the controller 26. The fiber plating programs stored in the computer 27 determine which of the plating stations 14, 16, 18, 20 will be used, the time intervals between stations, the entry rate of the fibers into the solutions, the duration in the solutions, and the withdrawal rate of the fibers from the solutions. These factors are dependent upon the strip length of the fibers and the fibers' use or application. The fiber plating programs also determine when the controller should cause the delivery of nitrogen to the beakers and the enclosure, the motor-driven beaker covers and the magnetic stirrer driving devices.

Although the system 10 is described with four plating stations, other embodiments of the system can have a greater or fewer plating stations. For example, the system can include an additional plating station with a beaker containing a second sensitizer solution for increasing the production capacity of the system.

Figure 2A:
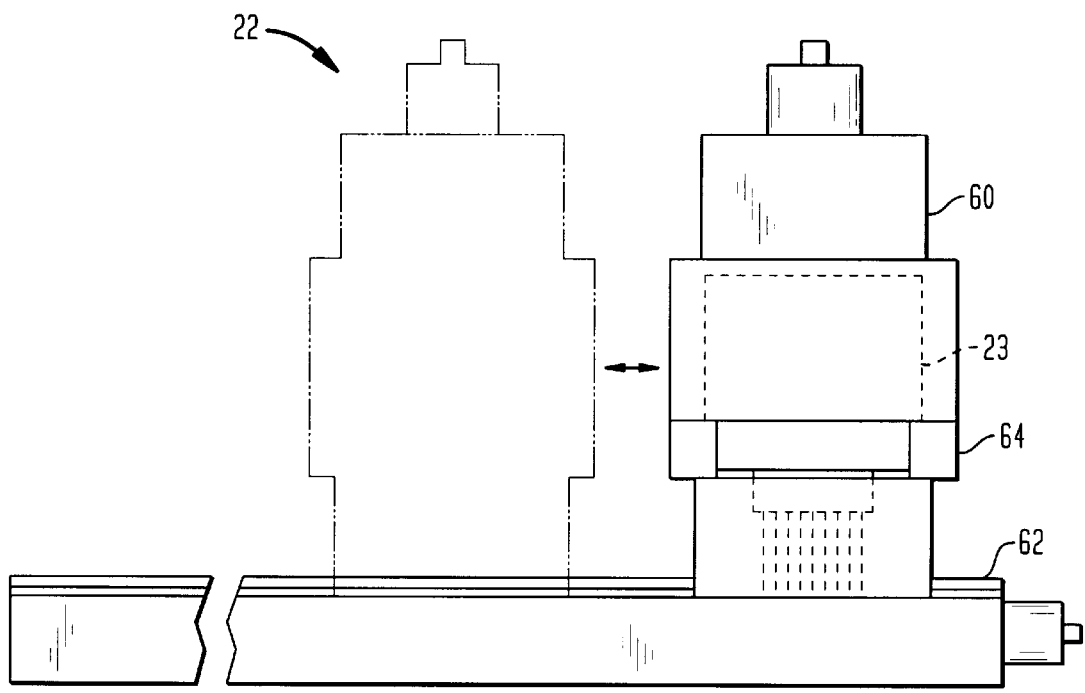
FIG. 2A is a front elevational view of the motor-driven fiber transport and dipping apparatus shown in FIG. 1.
Figure 2B:
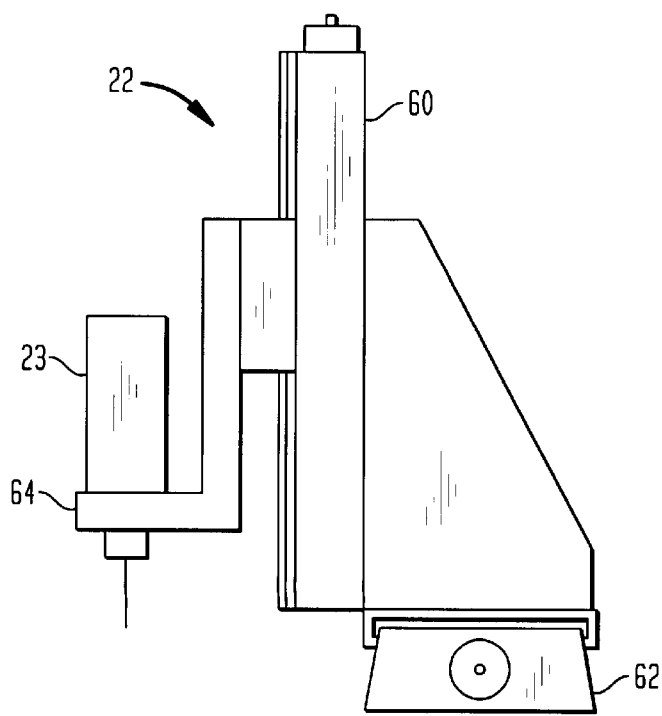
FIG. 2B is a side elevational view of the fiber transport and dipping apparatus of FIG. 2A.
Figure 2C:
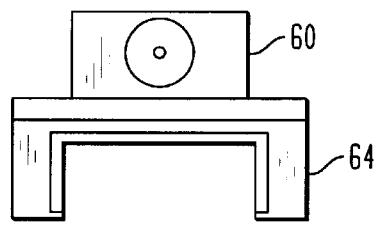
FIG. 2C is a top view of the fiber transport and dipping apparatus of FIG. 2A.
Figure 3A:
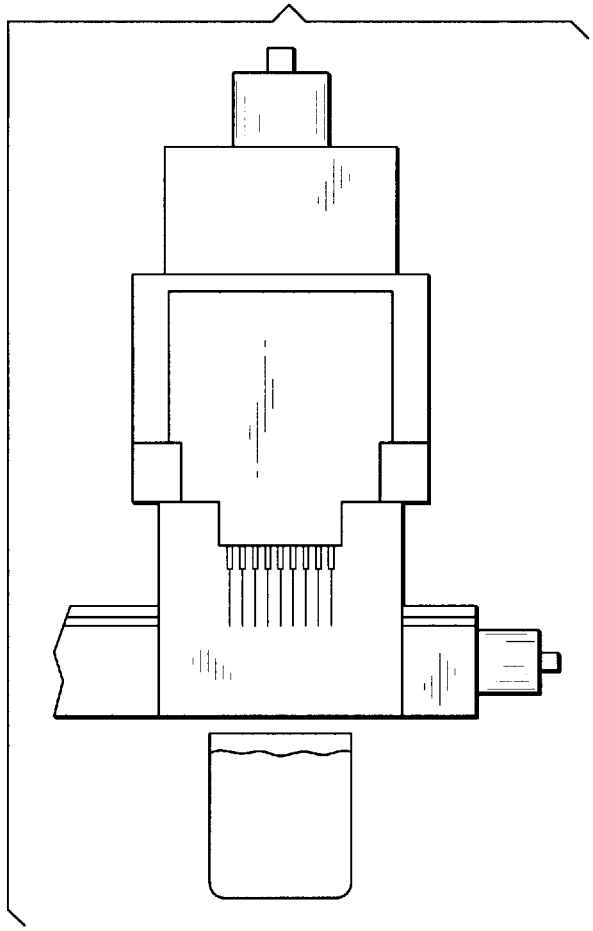
FIGS. 3A and 3B show the fiber transport and dipping apparatus immersing fibers in a plating solution.
Figure 3B:
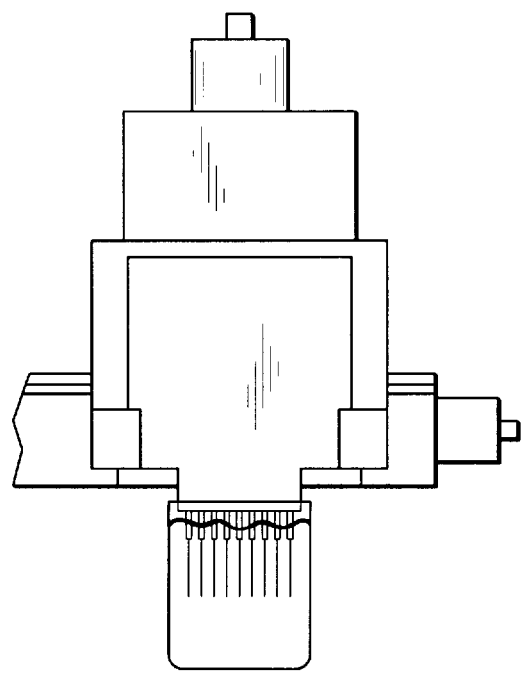

FIGS. 2A–2C show the fiber transport and dipping apparatus 22 of FIG. 1. The apparatus 22 comprises a motor-driven vertical translation table 60 attached to a motor-driven horizontal translation table 62. The vertical translation table 60 includes a vertically movable U-shaped fixture mount 64 (FIG. 2C) that holds the removable fiber holding fixture 23. The horizontal translation table 62 shuttles the vertical translation table 60 horizontally to the different plating stations in accordance with the programmable controller 26. The vertical translation table 60 lowers and raises the fiber holding fixture 23 to immerse the ends of the fibers in the various solutions in accordance with the programmable controller 26 as shown in FIGS. 3A and 3B.

Figure 4A:
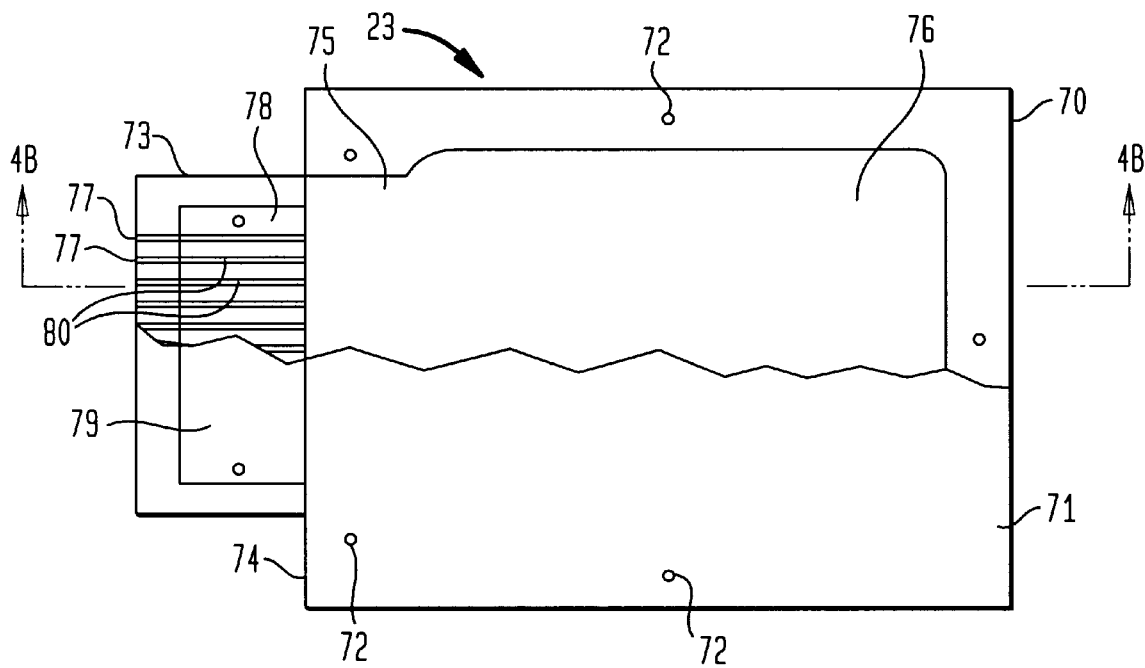
FIG. 4A is a top partial section view of the fiber holding fixture shown in FIG. 1.
Figure 4B:
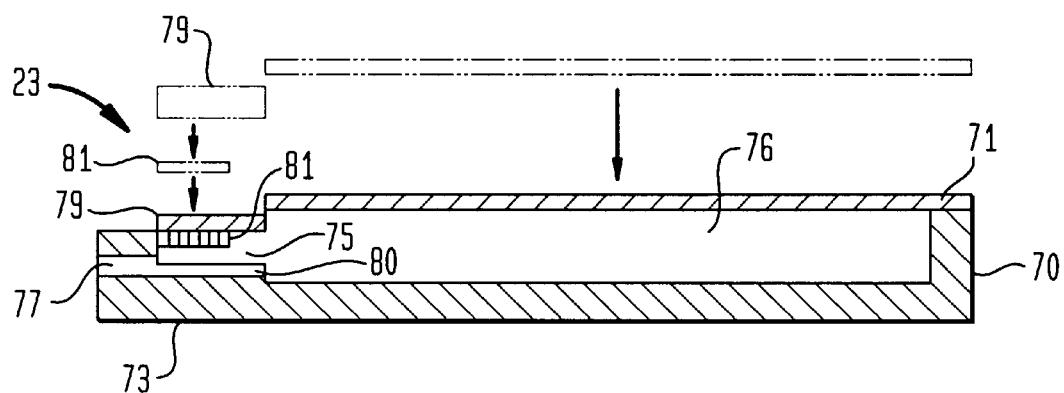
FIG. 4B is a sectional view of the fiber holding fixture of FIG. 1 through line 4B–4B.
Figure 4C:
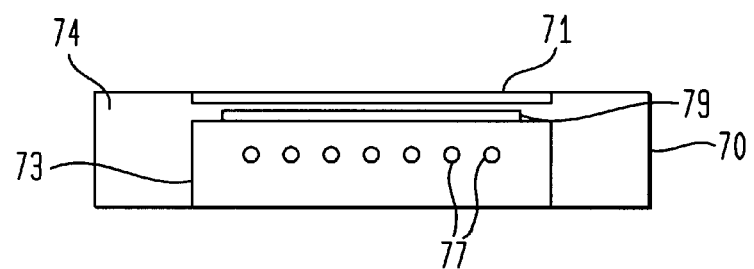
FIG. 4C is a front elevational view of the fiber holding fixture of FIG. 4A.
Figure 5:
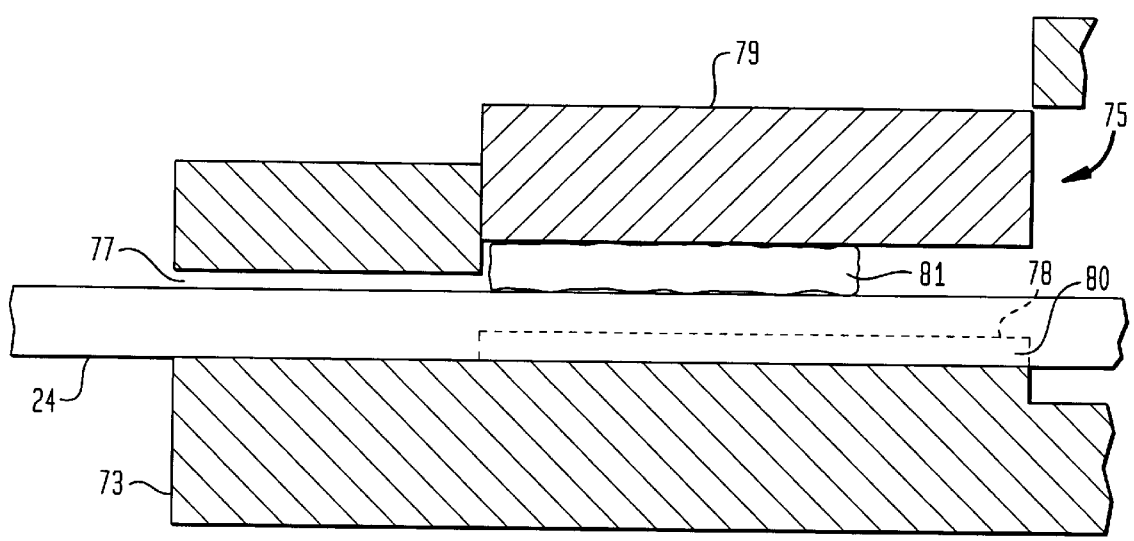
FIG. 5 is an enlarged sectional view showing an optical fiber clamped in the fiber holding fixture of FIG. 4A.

FIGS. 4A–4C show the structural details of the removable fiber holding fixture 23 of FIG. 1. The fixture 23 comprises a housing 70 with a removable lid or closure 71 that can be secured to the housing 70 with screw fasteners 72. The housing 70 includes a fiber clamping section 73 which projects from an opening 75 in an end wall 74 of the housing 70 that permits the clamping section 73 to communicate with the interior 76 of the housing 70. The terminal end of the clamping section 73 includes a plurality of openings or holes 77 through which the ends of the fibers emerge from the interior 76 of the fixture 23. The fiber clamping section 73 defines a clamping surface 78 with a plurality of parallel fiber aligning grooves 80 which align the fibers with the openings 77. A removable screw-fastened locking plate 79 attaches over the clamping surface 78. The locking plate 79 prevents axial and lateral movement of the fibers. A foam pad 81 is used between the fibers 24 and the locking plate to prevent breakage of the fibers 24 as shown in FIG. 5.

Figure 6:
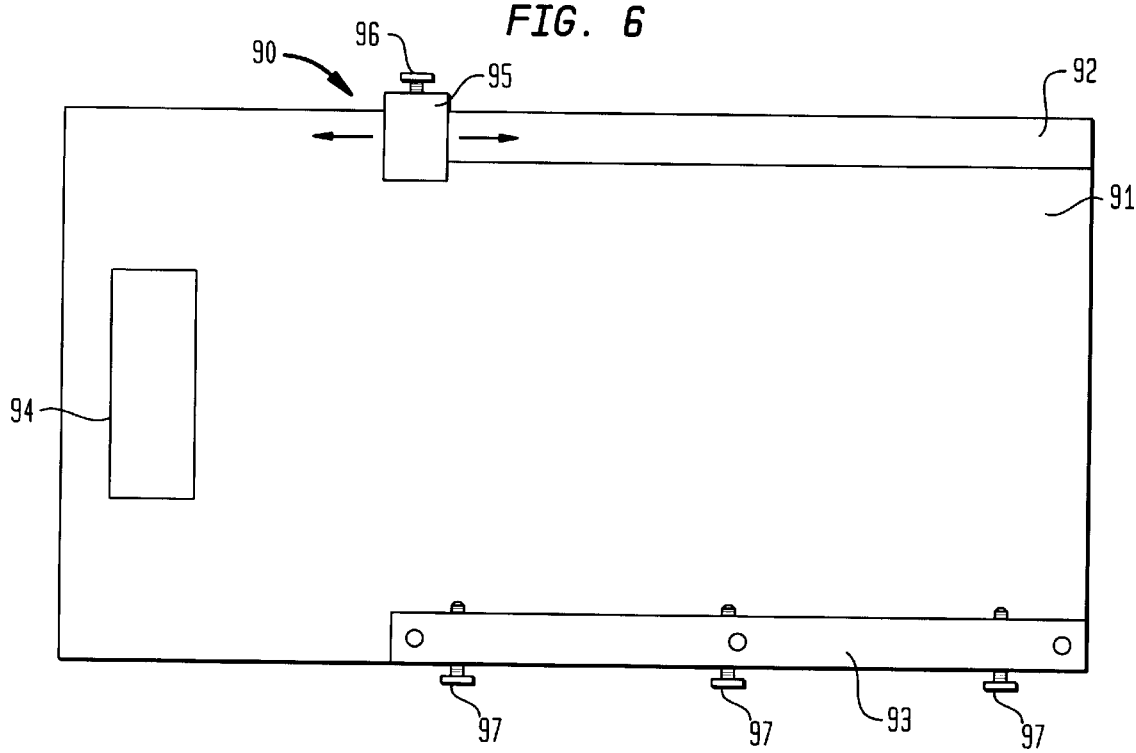
FIG. 6 is a top plan view of a fiber aligning fixture.

FIG. 6 shows a fiber aligning fixture 90 which can be used for aligning the ends of the fibers in the fiber holding fixture 23. The aligning fixture 90 comprises a base 91 having first and second fiber holding fixture guides 92, 93 and a fiber indexing block 94 attached to the top surface thereof. The first fixture guide 92 includes a sliding, lockable stop block 95 with a locking screw 96, which indexes the fiber holding fixture relative to a fiber indexing block 94 for setting the strip length $L_s$ of the fibers. The second fixture guide 93 includes a plurality of locking screws 97 which lock the fiber holding fixture into position between the guides 92, 93 (FIG. 7).

Figure 7:
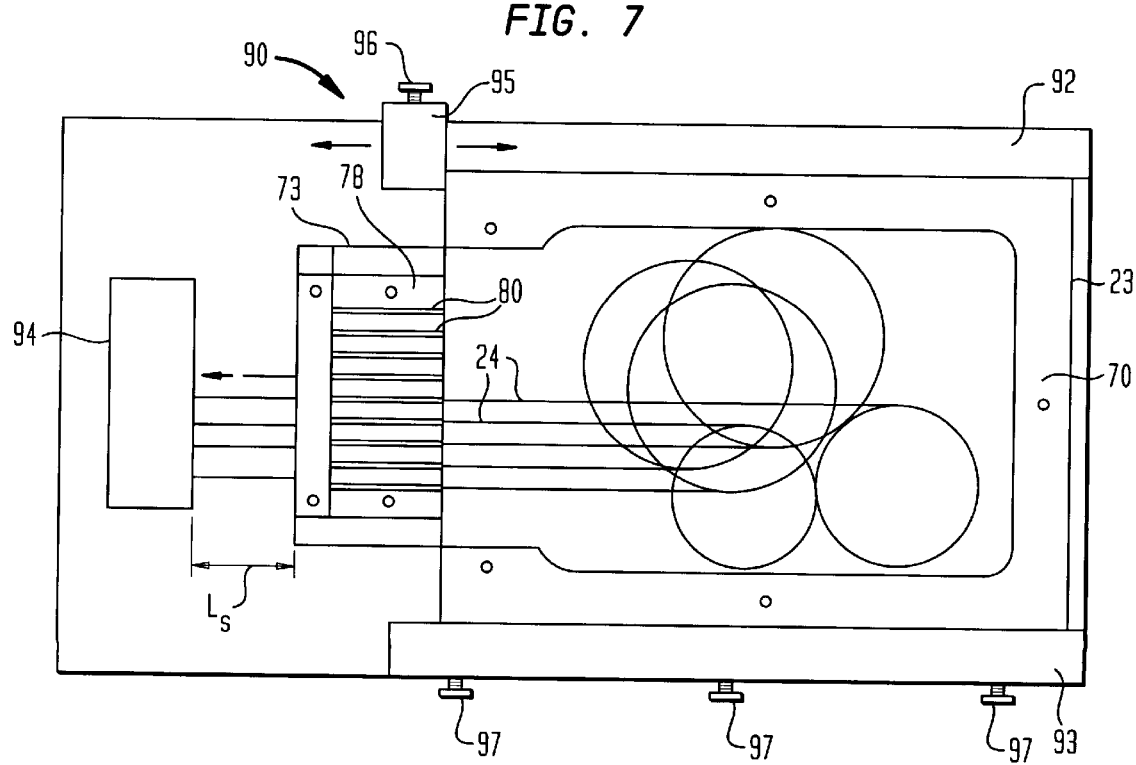
FIG. 7 is a top plan view showing optical fibers being installed and aligned in the fiber holding fixture using the aligning fixture 90 of FIG. 6.

FIG. 7 shows fibers 24 being installed and aligned in the fiber holding fixture 23 using the aligning fixture 90 of FIG. 6. Prior to mounting the holding fixture in the aligning fixture 90, the stop block 95 is adjusted to provide a desired strip length $L_s$ for the fibers 24. The holding fixture 23 is then mounted between the guides 92, 93 of the aligning fixture 90 and locked into position with the locking screws 97. Next, the fibers 24 are installed in the holding fixture 23 by threading their ends through the openings 77 of the clamping section 73 and placing them in abutment with the indexing block 94 of the aligning fixture 90. The sections of the fibers 24 extending across the clamping surface 78 are seated in the grooves 80 of the clamping section 73. The foam pad 81 is positioned over the fibers 24 seated in the grooves and the locking plate 79 is fastened to the clamping section 73 to lock the position of the fibers 24. The lid 71 is attached to the housing 70 and the fiber holding fixture 23 is removed from the aligning fixture 90. The fibers 24 clamped in the holding fixture 23 are all set to the same desired strip length $L_s$. The holding fixture 23 is now ready to be used in the automatic plating system 10 of FIG. 1 to plate the exposed end sections of the optical fibers 24 as described below.

Prior to plating, the protective polymer coating is stripped from the end sections of the fibers 24 to expose the fibers. This can be accomplished by manually holding the fixture and 20 dipping the fibers into an appropriate solvent. The holding fixture 23 is then mounted in the U-shaped fixture mount 64 of the vertical translation table 60 (of the transport and dipping apparatus 22 of FIG. 1). Access to the apparatus 22 is made through the door 52 of the enclosure 12. A desired plating program is downloaded from the computer 27 into the controller 26. Upon initiation of the plating program, nitrogen is delivered into the enclosure 12 and the beakers 36, 42 containing the sensitizer solution 38 and the sensitizer rinse solution 44. The transport and dipping apparatus 22 transports the fiber holding fixture 23 to the appropriate plating stations 14, 16, 18, 20 and immerses the exposed end sections of the fibers 24 in the solutions 30, 34, 38, 44 in accordance with the selected plating program. A typical plating program calls for sequential immersion in the preactivator solution 30 of the first plating station 14, the sensitizer solution 38 of the fourth plating station 20, the sensitizer rinse solution 44 of the third plating station 18, the activator solution 30 of the first plating station 14, and the activator rinse solution 34 of the second plating station 16. It should be understood, however, that other plating programs can omit immersion in the preactivator solution 30 prior to immersion in the sensitizer solution 38. In such a case, the plating program would typically call for sequential immersion in the sensitizer solution 38 of the fourth plating station 20, the sensitizer rinse solution 44 of the third plating station 18, the activator solution 30 of the first plating station 14, and the activator rinse solution 34 of the second plating station 16.

As can be seen, the automatic plating system 10 of the present invention carries out the fiber plating process with greater accuracy, sensitivity and repeatability than can be accomplished using manual dipping methods. This advantageously provides higher quality plated optical fibers and higher yields.

While the foregoing invention has been described with reference to the above embodiments, various modifications and changes can be made without departing from the spirit of the present invention. Accordingly, modifications and changes such as those suggested above but not limited thereto are considered to be within the scope of the claims.

What is claimed is:

1. A method of automated coating of optical fibers adapted for providing optical fibers having substantially consistent coatings thereon, the method comprising:

providing a plurality of plating stations, wherein each of the plurality of plating stations has a container with at least one solution therein to define a plurality of solutions;

aligning the optical fibers in a fiber aligning fixture so that the ends of the optical fibers extend substantially vertically therefrom;

positioning the fiber aligning fixture in a transport and dipping apparatus adapted for selectively moving the fiber aligning fixture horizontally and vertically, wherein the transport and dipping apparatus is coupled to a programmable controller for directing the movement of the transport and dipping apparatus;

activating the programmable controller to cause the transport and dipping apparatus to move horizontally so that the fiber aligning fixture is disposed above one of the plurality of plating stations and to move vertically so that the fiber aligning fixture is disposed with the ends of the optical fibers dipped into the container of the one of the plurality of plating stations, and wherein the programmable controller directs the transport and dipping apparatus to the plurality of plating stations in a selected order and at selected time intervals and directs the apparatus at each of the stations to immerse the ends of the optical fibers into the solutions at a selected entry rate, for a selected duration, and at a selected withdrawal rate to substantially consistently coat the optical fibers.

2. An automated system adapted for electroless metallization of optical fibers each having at least one end, the system comprising:

a plurality of spaced apart plating stations, each of the plating stations having at least one solution to define a plurality of solutions adapted for electroless metallization of optical fibers;

a motor-driven fiber transport and dipping apparatus including a removable fiber holding fixture having a fiber aligning fixture for aligning the optical fibers in the fiber holding fixture so that the ends of the optical fibers extend therefrom a selected distance, wherein the transport and dipping apparatus is adapted for shuttling optical fibers to the plating stations and immersing the optical fibers in the plurality of solutions; and a programmable controller for directing the transport and dipping apparatus to the plating stations in a selected order and at selected time intervals, and directing the apparatus at each of the stations to immerse the optical fibers into the plurality of solutions at a selected entry rate, for a selected duration, and at a selected withdrawal rate.

3. The system according to claim 2, wherein the fiber holding fixture comprises a protective housing that substantially encloses the fibers, allowing only the ends of the fibers to extend therefrom a selected distance for immersing in the solutions.

4. The system according to claim 2, wherein at least one of the plating stations has at least one solution comprising a preactivator for preparing the surface of the fibers for metallizing.

5. The system according to claim 2, wherein at least one of the plurality of plating stations has at least one solution comprising a sensitizer for depositing about a monolayer thick coating of metal on the surface of the fibers.

6. The system according to claim 2, wherein at least one of the plurality of plating stations has at least one solution comprising a rinse.

7. The system according to claim 2, wherein at least one of the plurality of plating stations has at least one solution comprising an activator for preparing a metal layer plated on the fibers for plating with at least one additional metal.

8. The system according to claim 2 comprising at least four plating stations to define a first, second, third and fourth plating station, wherein;

the first plating station has a solution comprising at least one sensitizer for depositing layer of metal;

the second plating station has a solution comprising a first rinse for removing excess sensitizer;

the third plating station has a solution comprising an activator for preparing the metal layer for plating with at least one additional metal; and the fourth plating station has a solution comprising a second rinse for removing excess activator from the base metal.

9. The system according to claim 8, wherein the activator also functions as a preactivator adapted for preparing the surface of the fibers for plating.

10. The system according to claim 9, wherein the plating stations are selectively arranged in an inline manner so that the first and second rinse solutions are located between the sensitizer and preactivator/activator solutions.

11. The system according to claim 8, wherein the sensitizer and first rinse solutions are held in containers which have motor-driven removable covers that are actuated by the programmable controller.

12. The system according to claim 2, wherein the plating stations and the transport and dipping apparatus are sealed in an enclosure that contains a nitrogen atmosphere.

13. The system according to claim 2, further comprising a plurality of magnetic stirrers for stirring the solutions during metallizing.

14. The system according to claim 2, wherein the transport and dipping apparatus includes a motor-driven horizontal translation table and a motor-driven vertical translation table, the vertical table for immersing the fibers in the solutions and the horizontal table for moving the vertical table to the plating stations.

15. An automated system adapted for consistently coating optical fibers, each of the optical fibers having at least one end, the system comprising:

a plurality of spaced apart plating stations, each of the plating stations having at least one solution to define a plurality of solutions adapted for coating the optical fibers;

a fiber transport and dipping apparatus including a fiber aligning fixture for aligning the optical fibers so that the ends of the optical fibers extend substantially vertically from the transport and dipping apparatus a selected distance, wherein the transport and dipping apparatus is adapted for shuttling the optical fibers to the plating stations and immersing the optical fibers into the plurality of solutions; and a programmable controller for directing the transport and dipping apparatus to the plating stations in a selected order and at selected time intervals and for directing the apparatus at each of the stations to immerse the optical fibers into the plurality of solutions at a selected entry rate, for a selected duration, and at a selected withdrawal rate, so that each one of the optical fibers in the fiber aligning fixture are coated substantially consistently to each other of the plurality of optical fibers.

16. The system of claim 15 in which the plurality of solutions include a sensitizer solution, a preactivator and activator solution, and a coating solution.

17. The system of claim 16 in which the preactivator and activator solution comprises a solution of palladium.

18. The system of claim 15 in which the plating stations are housed in an enclosure having a nitrogen atmosphere.

* * * * *